United States Patent [19]

Hino

[11] Patent Number: 6,046,394
[45] Date of Patent: Apr. 4, 2000

[54] MUSIC SCORE RECOGNIZING METHOD AND COMPUTER-READABLE RECORDING MEDIUM STORING MUSIC SCORE RECOGNIZING PROGRAM

[75] Inventor: Tetsuo Hino, Hamamatsu, Japan

[73] Assignee: Kabushiki Kaisha Kawai Gakki Seisakusho, Hamamatsu, Japan

[21] Appl. No.: 09/254,306

[22] PCT Filed: Jun. 24, 1998

[86] PCT No.: PCT/JP98/02807

§ 371 Date: Mar. 3, 1999

§ 102(e) Date: Mar. 3, 1999

[87] PCT Pub. No.: WO99/03090

PCT Pub. Date: Jan. 21, 1999

[51] Int. Cl.[7] .................................................. G09B 15/02
[52] U.S. Cl. .............................................................. 84/477 R
[58] Field of Search ................................ 84/477 R, 478, 84/DIG. 6

[56] References Cited

FOREIGN PATENT DOCUMENTS

| 1304497 | 12/1989 | Japan . |
| 6102868 | 4/1994 | Japan . |
| 6150001 | 5/1994 | Japan . |

*Primary Examiner*—Stanley J. Witkowski
*Attorney, Agent, or Firm*—Christie, Parker & Hale, LLP

[57] ABSTRACT

Projections onto the transverse axis are derived from a staff start position xs to a staff end position xe with respect to four staff sections surrounded by staff positions L(5) of L0 to L4 set per sign. If a width of a section x1-x2 where a value of the projection exceeds a given threshold value thr1 exceeds another given threshold value thr2, a rectangle surrounded by x1, x2, L0 and L4 is set to be a label for extracting a feature of the corresponding sign. The foregoing four staff sections which do not overlap with a staff image are set to be extracting sections in the label for obtaining peripheral features in the transverse direction. The peripheral features are derived up to the third order from the left and right ends in each extracting section. Further, each extracting section is divided into a plurality of mesh sections which are set so as to partly overlap with each other in the height direction. The mean value of the peripheral features in each mesh section is derived per order and set to be a feature amount in each mesh section. This is derived for each of the left and right ends and per mesh section and set to be a feature of the label. The sign having a fixed position on the staff or having the staff in a grid in a music score image is recognized through pattern matching with features stored in a dictionary. With this arrangement, the music signs are recognized from the music score image, and data is prepared for playing or music score displaying.

2 Claims, 3 Drawing Sheets ined label, the height positions are the staff positions themselves so that there are no errors caused upon the label extraction. On the other hand, since the transverse positions are based on the projection segmenting, certain-level errors are expected. However, in this structure, since the foregoing peripheral features from the left and right ends are used as features to be used in the pattern matching, the errors of the transverse positions can be converted into errors relative to the reference patterns.

MUSIC SCORE RECOGNIZING METHOD AND COMPUTER-READABLE RECORDING MEDIUM STORING MUSIC SCORE RECOGNIZING PROGRAM

TECHNICAL FIELD

The present invention relates to a music score recognizing method which can achieve a high recognition rate without deleting the staff, and a computer-readable recording medium storing a music score recognizing program.

BACKGROUND ART

When recognizing notes, rests and other signs on a music score using a personal computer, a scanner, etc., a music score image is two-valued and read in, then the staff and paragraphs are recognized, then, after deleting the staff per paragraph, a given rectangular label for reading is set per sign to carry out pattern matching between such label data and label data prepared in a dictionary in advance so that the signs are recognized.

In the foregoing recognition method, however, the staff deletion also removes from the image those portions of the sign on the staff which are in abutment with the staff. Thus, the continuity of pixels is spoiled so that labeling of that sign can not be performed due to such division. As a result, there is a problem that a sign to be recognized can not be precisely recognized as one unitary sign. For solving this problem, a technique of holding divided images on the staff has been used. However, since this method is also not complete, the labeling failure due to the staff deletion can not be avoided, thereby to cause lowering of the recognition rate. Further, if noise remains at the time of the staff deletion, a plurality of signs which should be separate labels are pixel-coupled (label coupling) due to the noise so as to be extracted as one label, which adversely affects the recognition.

The present invention has been made in view of the foregoing problems of the prior art and provides a music score recognizing method which can achieve a high recognition rate without deleting the staff, and a computer-readable recording medium storing a music score recognizing program.

DISCLOSURE OF THE INVENTION

As a result of analyzing the foregoing problems, the present inventors have made the present invention shown below in consideration that if objects to be recognized are narrowed down to those signs, such as clefs, time signatures, abbreviations, accidentals and rests, whose height positions are fixed on the staff or whose height positions are fixed using the staff as a grid and whose featuring enabling ranges exist within the staff, those portions which can fully feature object images can be precisely label-extracted and those features which are reluctant to an influence of deformation, rubbing or staining can be extracted from obtained labels so that the precise recognition can be achieved without deleting the staff.

Specifically, a structure of the present invention (applicable also to a structure of a computer-readable recording medium according to claim 2) is basically characterized, in a music score recognizing method of reading an image of a music score and recognizing music signs therein to prepare data for playing or music score displaying, in that, as shown in later-described FIG. 3, projections onto a transverse axis are derived from a staff start position xs to a staff end position xe with respect to a given height section y1-y2, set per sign, based on staff positions and, if a width of a section x1-x2 where a value of the projection exceeds a given threshold value th1 exceeds another given threshold value th2, a rectangle surrounded by x1, x2, y1 and y2 is set to be a label for extracting a feature of the corresponding sign (label extracting function), that, as shown in later-described FIG. 4, sections in the height section y1-y2 which do not overlap with a staff image are set to be extracting sections in the label for obtaining peripheral features in a transverse direction, the peripheral features derived for a plurality of orders from left and right ends in each extracting section, and further, as shown in later-described FIG. 5, each extracting section is divided into a plurality of mesh sections which are set so as to partly overlap with each other in a height direction, and a mean value of the peripheral features in each mesh section is derived per order and set to be a feature amount in each mesh section, the feature amount per order derived for each of the left and right ends and per mesh section and set to be a feature of the label (feature amount extracting function), and that the sign having a fixed position on the staff or having the staff in a grid in the music score image is recognized through pattern matching with features stored in a dictionary (pattern matching function).

The structure of claim 2 provides a computer-readable recording medium storing a music score recognizing program for executing the label extracting function, the feature amount extracting function and the pattern matching function which represent the foregoing structure of claim 1.

With respect to the range where an object sign can be fully featured, the height range is set to given sections among four sections formed by the staff (see later-described FIGS. 3 and 4) and the transverse range is derived by utilizing the projections onto the transverse axis in the foregoing height section. Thus, the label extraction can be achieved without deleting the staff. At this time, division is expected with respect to a portion of signs such as F clef. However, since these are adjacent to each other, coupling thereof is possible in a later process.

In the thus derived label, the height positions are the staff positions themselves so that there are no errors caused upon the label extraction. On the other hand, since the transverse positions are based on the projection segmenting, certain-level errors are expected. However, in this structure, since the foregoing peripheral features from the left and right ends are used as features to be used in the pattern matching, the errors of the transverse positions can be converted into errors relative to the reference patterns.

Further, the sections where the peripheral features are derived are set to be those sections free of an influence of the staff, each section is divided into meshes partly overlapping with each other, and the average in each mesh is set to be the feature amount. Thus, the feature amount can be reluctant to an influence of deformation, dimness, staining or dislocation of the image.

When recognizing a sign (C clef, abbreviation, key signature or the like) whose pixels are not continuous in an actual image, in the normal recognition method, recognition is first carried out per label in which pixels are continues, then a positional relationship of the individual labels is examined so as to determine the recognition result. On the other hand, the label extracting method (function) in the foregoing structure can extract the foregoing sign as one label so that simplification in recognition process and improvement in recognition accuracy can be achieved.

BEST MODE FOR CARRYING OUT THE INVENTION (Carrying-Out Mode 1)

Figure 1:
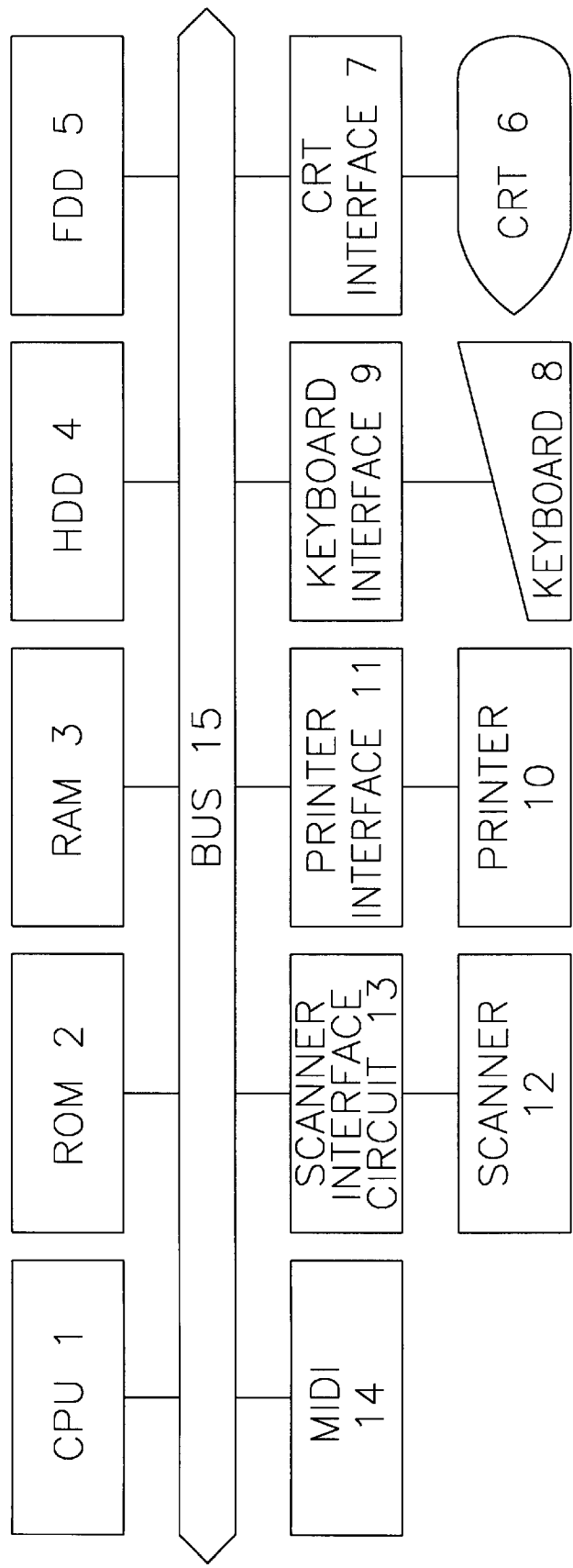
FIG. 1 is a block diagram showing an embodiment structure of a music score recognizing system which is operated by reading into an external storage device a computer-readable recording medium storing a music score recognizing program according to the present invention.

Hereinbelow, one carrying-out mode of the present invention will be described based on the accompanying drawings. FIG. 1 is a block diagram showing an embodiment structure of a music score recognizing system which is operated by reading into an external storage device such as a later-described flexible disk drive FDD 5 (or a CD-ROM drive or the like) a computer-readable recording medium storing a music score recognizing program according to the present invention. The system is in the form of a computer such as a personal computer, added with a scanner and a MIDI interface circuit. A CPU 1 is a central processing unit for controlling the whole music score recognizing system based on programs stored in a ROM 2 or RAM 3. Further, a timer circuit is included for executing an interrupt to the CPU 1 per given preset period. Other than as a program area, the RAM 3 is also used as an image data buffer, a work area, etc. A hard disk drive HDD 4 and the flexible disk drive FDD 5 store programs, image data, playing data, etc. Under the control of the CPU 1, a CRT 6 displays image data outputted from a CRT interface circuit 7. Data inputted via a keyboard 8 is transferred into the CPU 1 via a keyboard interface circuit 9. Under the control of the CPU 1, a printer 10 prints print data outputted from a printer interface circuit 11.

A scanner 12 optically scans, for example, a (printed) music score and converts it into two-valued image data, gray-scale image data or color image data, and can be of a desired type, such as a flat-bed bed type, a handy type or a feeder type. Image data captured by the scanner 12 is inputted into the RAM 3 or the HDD 4 via a scanner interface circuit 13. A MIDI interface circuit 14 is a circuit for carrying out transmission/reception of MIDI data relative to an external MIDI device such as a tone generator module. A bus 15 connects the respective circuits in this music score recognizing system for allowing them to exchange various data, programs, addresses, etc. In addition thereto, a pointing device such as a mouse, a serial interface circuit such as an RS232C, or the like may be provided.

In this structure, as shown in Table 1 below, reference patterns to be used in the pattern matching are prepared in advance for each of staff sections where features are to be extracted. As described later, the order of feature vector data with respect to these reference patterns differs depending on the number of the staff sections.

TABLE 1

| staff sections 1 to 5 | staff sections 1 to 3 | staff sections 3 to 5 | given three sections | given two sections |
|---|---|---|---|---|
| clef (large/small) | denominator of time signature | numerator of time signature | accidental between lines | accidental on lines |
| time signature | | | sixteenth rest | quarter |

TABLE 1-continued

| staff sections 1 to 5 | staff sections 1 to 3 | staff sections 3 to 5 | given three sections | given two sections |
|---|---|---|---|---|
| not in fraction abbreviation | | | thirty-second rest | rest eighth rest |

Figure 2:
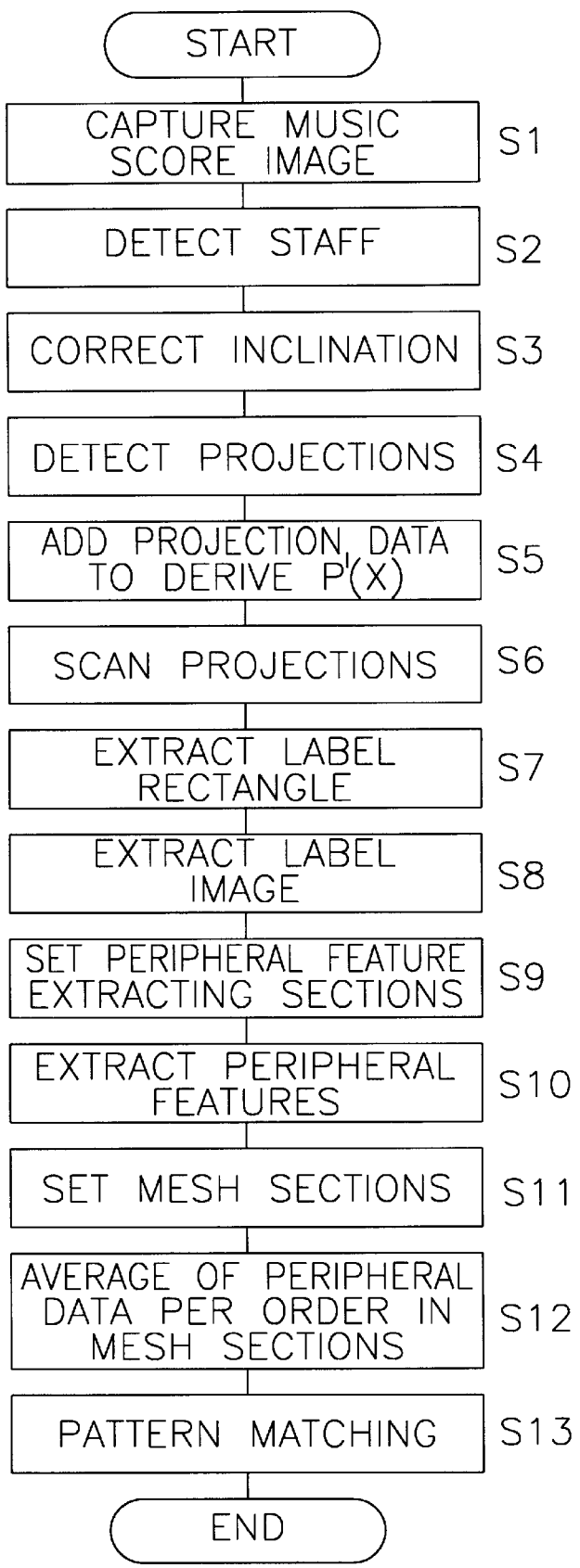
FIG. 2 is a flowchart showing the main process of a CPU.

FIG. 2 is a flowchart showing the main process of the CPU 1. At step S1, an image of a music score is inputted into the RAM 3 by the scanner 12. The image is inputted as two-valued image data. At step S2, the staff is detected in the inputted two-valued music score image. At step S3, an inclination correction is executed based on a deviation of each of the five lines relative to the horizontal line. At this time, staff positions (for example, the fifth line L0, the fourth line L1, . . . , the fifth line L4) are stored as L(5), and staff widths (widths of the respective lines of the staff) are stored as Lth.

An order of recognizing a sign is such that recognition starts from an extracting section where the recognition accuracy is as high as possible (in order of wider extracting sections). The original images in the label which have been successfully recognized are deleted in order. Prior to performing such recognition, the label extraction needs to be carried out. In this structure, it is carried out in the following manner. At step S4, projections (projection amounts) onto the transverse axis are derived from a staff start position xs to a staff end position xe with respect to the four staff sections (corresponding to a height section y1-y2 in claim 1 or 2) surrounded by the staff positions L(5) of L0 to L4 shown in FIGS. 3 and 4, and stored as P(4)(x).

When recognizing signs (clefs, abbreviations, a portion of time signatures) in the foregoing staff sections surrounded by L0 to L4, step S5 adds together the projection data of all the four staff sections to derive P'(x), and sets a projection segmenting threshold value thr1 and a segmenting object width threshold value thr2 from the staff widths (thr2=Lth).

At step S6, the projections are scanned from x=0. At step S7, x which gives P'(x)>thr1 is set to x1, and x which gives P'(x)<thr1 is set to x2. Then, if x2-x1>thr2, a rectangle surrounded by x1, x2, L0 and L4 is set to be a label rectangle (in FIG. 3, netted portions represent segmented labels). The foregoing process is carried out up to the staff end position so that the labeling is finished. At this time, since it is possible that F clef can not be precisely extracted, if positions of the adjacent labels are close to each other, the label coupling is executed (it may also be arranged that after the sign recognition in this projection range is finished, only the rejected labels are subjected to coupling so as to carry out the recognition again using a coupled label).

Figure 4:
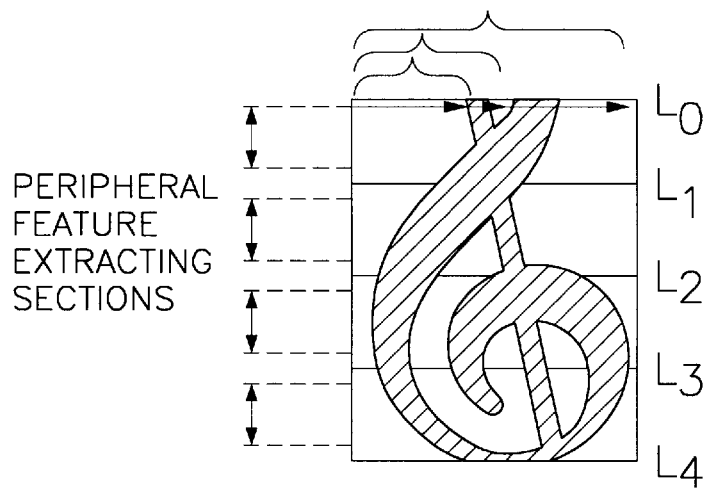
FIG. 4 is an explanatory diagram showing peripheral feature extracting sections on label data and a peripheral data extracting method.

At step S8, as shown in FIG. 4, a label image is extracted from the foregoing label rectangle so that positions corresponding to the staff positions L(5) on the original image are set to be coordinate values L'(5) on the label image.

At step S9, as shown in FIG. 4, ranges where peripheral features are derived are set with respect to four sections formed by L'(5) so as to be defined from [L'(n)+Lth/2] to [L'(n+1)−Lth/2], respectively. Offsets of Lth/2 are provided for allowing the feature deriving sections to be out of influence of the staff.

At step S10, the peripheral features are derived up to the third order for each of the foregoing sections from the left and right ends thereof, respectively. As shown in FIG. 4, the peripheral data are obtained by carrying out transverse scanning from the left and right ends to the opposite ends to derive lengths of scanning lines up to the third order (first-order peripheral, second-order peripheral, third-order peripheral) at points where white pixels change to black pixels. The peripheral data are derived for all the sections and stored.

Figure 5:
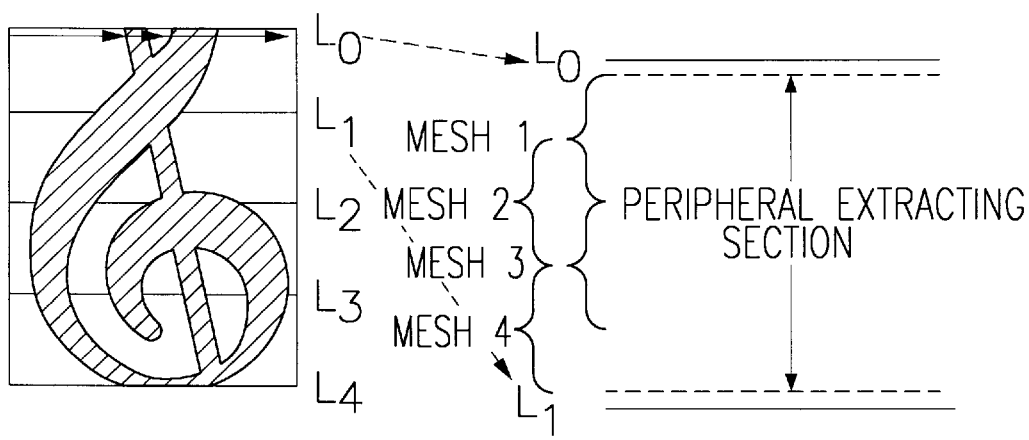
FIG. 5 is an explanatory diagram showing the state wherein mesh sections are further set in each of the peripheral feature extracting sections on the label data.

Then at step S11, as shown in FIG. 5, four mesh sections are set in each section. The mesh sections are set so as to overlap with the adjacent mesh sections by half of the mesh width. The number of the mesh sections is 16 at each of the left and right ends and thus 32 in total.

Buffers for storing feature amounts in each mesh are set to V(d)(n) (d:peripheral order, n:mesh). At step S12, the peripheral data in the foregoing mesh sections are averaged per order and the thus obtained values are stored in the buffers.

At step S13, the thus obtained 3×32=96 order feature amounts are subjected to pattern matching with the foregoing reference patterns [reference patterns for signs with respect to feature sections, i.e. the staff sections surrounded by L0 to L4] prepared in advance through the like process. A comparison method in the matching is a comparison method wherein weighting is applied to variations of the feature amounts in consideration of errors in a transverse direction of the projection segmenting.

Recognition for the other staff sections is carried out similarly to the above. In this case, the order of the extracted feature amounts is given by (the number of staff sections)×2 (from left and right)×4 (the number of meshes in each section)×3 (peripheral order).

In the label extracting method in this structure, for rendering accurate the transverse position of the extracted label, the projections limited to the range of given sections, set per sign, of the staff sections (for example, the sections from L0 to L4 in case of G clef as shown in FIG. 4) can be utilized. Further, since the feature extracting positions and the mesh sections (the staff positions themselves are not included in the mesh sections) are also based on the staff positions, an obtained feature distribution is accurate relative to the staff positions so that the consistent features can be obtained relative to a sign whose height position is determined by the staff. In the foregoing manner, the signs having the fixed positions on the staff or having the staff in a grid in the music score image as shown in Table 1 can be recognized.
(Carrying-Out Mode 2)

Pattern matching between projection data in the range segmented in the label segmenting based on the projections in the foregoing carrying-out mode and reference projection data prepared through the like process is used as a pre-matching process of the pattern matching using the foregoing peripheral features. If the matching degree in the pre-matching process is low, the step S8 and subsequent steps are avoided so as to achieve the speed-up of the recognition process. If the matching degree in the pre-matching satisfies a reference value, the pattern matching including that matching degree is carried out at step S13 so as to improve the recognition accuracy.
(Carrying-Out Mode 3)

Although the peripheral data in the transverse direction are used as the features used in the pattern matching, peripheral data in the height direction are added to the foregoing features in consideration of improving the recognition accuracy. As the peripheral data in the height direction, scanned data up to the third order from upper and lower sides (corresponding to given staff positions) of the extracting sections are used. Since the label segmenting based on the projections include errors of the label rectangles in the transverse direction, if the feature extracting positions are set based on the transverse directions of the label rectangles, it is possible that the recognition can not be well achieved. In view of this, a transverse position where a positive peak of the projection data in the range of the segmented rectangle is obtained is set to xpm, while a transverse position where a negative peak thereof is obtained is set to xpf and, by utilizing the peripheral data in the sections having the respective positions at their centers, the sign features which are free of an influence of the transverse error of the label rectangle can be extracted.
(Carrying-Out Mode 4)

Figure 3:
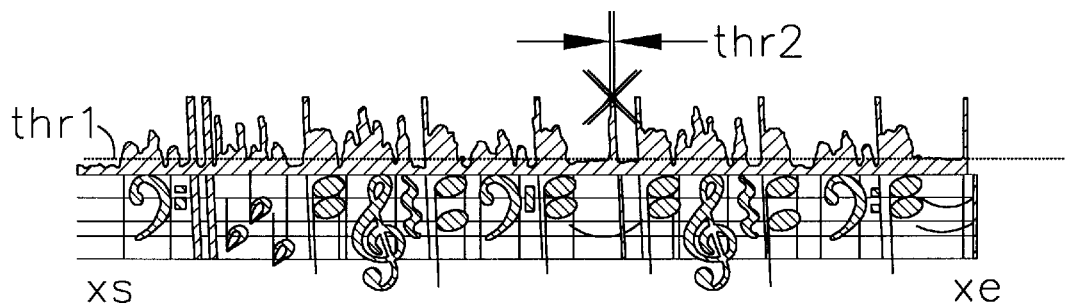
FIG. 3 is an explanatory diagram showing a method of labeling using projections onto the transverse axis.

In the conventional recognition method, after individual accidentals such as flat are recognized, a key signature is recognized in light of a relationship of the respective positions thereof. However, since this positional relationship can not be precisely recognized, the recognition of a key signature has been considered to be difficult. In the structure of the present invention, as shown in FIG. 3, since the key signature can be extracted in a lump (an example shown by three flat accidentals in the figure), the recognition of such a key signature or the like can be achieved using the foregoing method.
(Carrying-Out Mode 5)

With respect to a text fixedly arranged on a rule, the text can be recognized according to the foregoing structure of the present invention, using rule positions instead of the staff positions.

According to the structure of the present invention as described above in detail, the given sections among the four sections defined by the staff are set with respect to the height range, while the transverse range is derived by utilizing the projections onto the transverse axis in the foregoing height sections. Therefore, the label extraction can be carried out without deleting the staff. In the thus derived label, the height positions are the staff positions themselves so that there are no errors caused upon the label extraction. On the other hand, even in the label extraction according to the projection segmenting at the transverse positions wherein certain-level errors are considered, since the pattern matching is executed using the peripheral features from the left and right ends, the errors of the transverse positions can be converted into errors relative to the reference patterns. Further, the sections where the peripheral features are derived are set to be those sections free of an influence of the staff, each section is divided into meshes partly overlapping with each other, and the average in each mesh is set to be the feature amount. Thus, the feature amount can be reluctant to an influence of deformation, dimness, staining or dislocation of the image.

Industrial Applicability

As described above, the structures of the music score recognizing method and the computer-readable recording medium storing the music score recognizing program are useful for a case where a music score is mechanically recognized, and particularly suitable for a case where data for a karaoke performance is prepared from a music score or a case where a manual performance is partly replaced with a mechanical performance in studio recording or live performance.

It is claimed:

1. A music score recognizing method of reading an image of a music score and recognizing music signs therein to prepare data for playing or music score displaying, said music score recognizing method characterized in that projections onto a transverse axis are derived from a staff start position xs to a staff end position xe with respect to a given height section y1-y2, set per sign, based on staff positions, that if a width of a section x1-x2 where a value of the projection exceeds a given threshold value th1 exceeds another given threshold value th2, a rectangle surrounded by x1, x2, y1 and y2 is set to be a label for extracting a feature of the corresponding sign, that sections in said height section y1-y2 which do not overlap with a staff image are set to be extracting sections in said label for obtaining peripheral features in a transverse direction, said peripheral features derived for a plurality of orders from left and right ends in each extracting section, that each extracting section is divided into a plurality of mesh sections which are set so as to partly overlap with each other in a height direction, that a mean value of the peripheral features in each mesh section is derived per order and set to be a feature amount in each mesh section, said feature amount per order derived for each of the left and right ends and per mesh section and set to be a feature of said label, and that the sign having a fixed position on the staff or having the staff in a grid in the music score image is recognized through pattern matching with features stored in a dictionary.

2. A computer-readable recording medium storing a music score recognizing program for reading an image of a music score and recognizing music signs therein to prepare data for playing or music score displaying, said music score recognizing program having a label extracting function of deriving projections onto a transverse axis from a staff start position xs to a staff end position xe with respect to a given height section y1-y2, set per sign, based on staff positions, and of, if a width of a section x1-x2 where a value of the projection exceeds a given threshold value th1 exceeds another given threshold value th2, setting a rectangle surrounded by x1, x2, y1 and y2 to be a label for extracting a feature of the corresponding sign, a feature amount extracting function of setting sections in said height section y1-y2 which do not overlap with a staff image, to be extracting sections in said label for obtaining peripheral features in a transverse direction, said peripheral features derived for a plurality of orders from left and right ends in each extracting section, of dividing each extracting section into a plurality of mesh sections which are set so as to partly overlap with each other in a height direction, and of deriving a mean value of the peripheral features in each mesh section per order so as to set it to be a feature amount in each mesh section, said feature amount per order derived for each of the left and right ends and per mesh section and set to be a feature of said label, and a pattern matching function of recognizing the sign having a fixed position on the staff or having the staff in a grid in the music score image, through pattern matching with features stored in a dictionary.

* * * * *